Patented Jan. 16, 1934

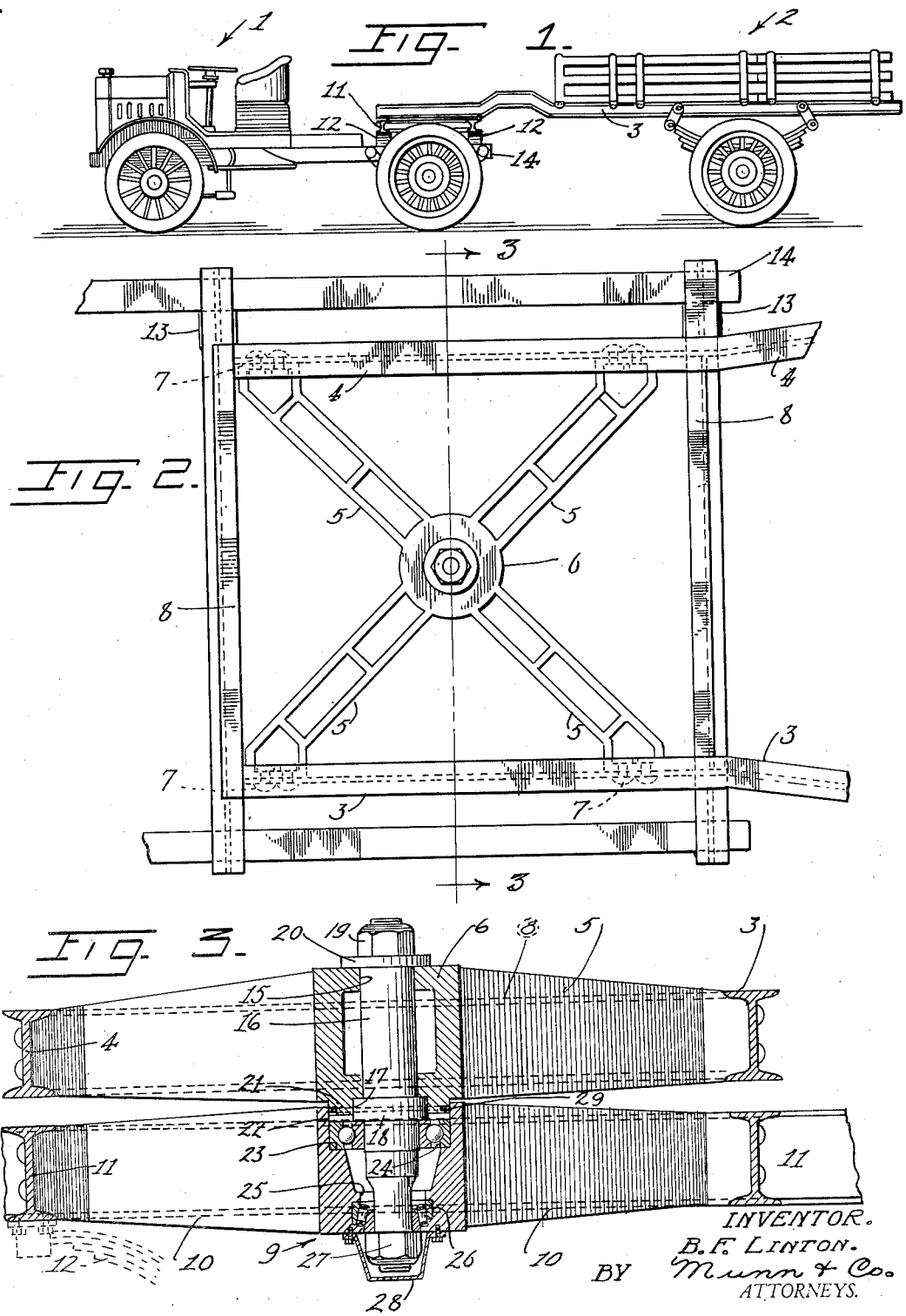

1,943,735

UNITED STATES PATENT OFFICE 1,943,735

FIFTH WHEEL FOR TRAILERS

Bert F. Linton, Visalia, Calif.

Application July 27, 1929. Serial No. 381,613

6 Claims. (Cl. 308—220)

My invention relates to improvements in a fifth wheel for trailers, and it consists in the combinations, constructions and arrangements hereinafter described and claimed.

An object of my invention is to provide a fifth wheel for all makes of trailers and the like, in which all of the bearings run in oil and are positively protected against dirt and dust. The wheel is extremely simple in construction and is strong and durable for the purpose intended. At the same time, the wheel is light in weight, which is a big factor in the manufacture of trailers.

Another object of the invention is to so arrange the bearing for the free end of the shaft which connects the upper and lower members respectively of the trailer and truck, that the weight of the trailer imposed on the shaft will cause an infinitesimal loosening in parts of the bearing so as to relieve binding pressure on the bearing elements thus avoiding any wedging and enabling an utmost freedom of turning.

A further object of the invention is to provide a bearing structure which is located medially of the bearing assemblage, said structure involving a certain interfitted flange and cylindrical cavity, said cavity containing unitary thrust and radial bearing means on which much of the load is imposed by virtue of its spacing from the flange and the contact therewith by a shoulder on a connecting shaft.

Other objects and advantages will appear as the specification proceeds, and the novel features will be particularly pointed out in the claims hereto attached.

My invention is illustrated in the accompanying drawing, in which:

Figure 1 is a side elevation of a truck and trailer showing my device operatively applied thereto;

Figure 2 is a top plan view of the device; and

Figure 3 is a section along the line 3—3 of Figure 2.

In carrying out my invention, I make use of a truck indicated generally at 1 and a trailer indicated generally at 2. These two are pivotally connected together by the fifth wheel which will now be described.

The front end of the trailer 2 has I-beams 3 and 4 disposed at its sides. To these beams I connect four girders 5 that extend radially from a member 6 which constitutes a common center. The ends of these girders or arms may be secured to the I-beams by bolts 7 or other suitable fastening means. The front ends of the I-beams 3 and 4 are connected together by a cross bar 8.

I will refer to the arms 5 and the central member 6 as an upper rotatable member hereafter. Beneath the rotatable member 6 I dispose a similar member 9, hereafter known as the lower member, having radially-extending arms 10 that are secured to I-beams 11 (see Figure 3). These I-beams are positioned directly below the I-beams 3 and 4, and are carried by springs 12 (see Figures 1 and 3) which in turn are supported by transverse members 13 carried by the truck chassis 14. The members 13 and 14 lie in the same plane. It is obvious that some other attachment could be made between the lower member 9 and the truck 1 if desired without departing from the spirit and scope of my invention.

The upper member 6 has a bore 15 extending therethrough, and a stub shaft 16 is disposed in the bore. The member 6 also has a recess 17 for receiving a shoulder 18 on the shaft 16. A nut 19 and a washer 20 are disposed at the top of the shaft 16, and the nut rigidly secures the shaft to the member 6.

The bottom of the member 6 has an annular flange 21 which has a running fit in the upper portion of a cavity 22 in the lower member 9.

A shoulder 23 is formed in the wall of the cavity and supports a unitary thrust and radial bearing 24. This bearing includes complementary races respectively on the shaft and on the lower member, and bearing elements therebetween. An annular flange 25 extending inwardly from the wall of the cavity or recess, forms a shoulder for receiving a roller bearing 26. This bearing prevents gyration of the shaft end. The bearings are inclined with respect to the axis of the shaft 16 for withstanding end thrust. The inner bearing race occurs on the shaft, the outer race being on the lower member 9. The inward taper of the races has the important effect of relieving binding pressure on the interposed rollers under the weight of the vehicle imposed on the shaft, it being apparent that the downward pressure on the shaft tends toward an infinitesimal separation of the inner race from the rollers, thus avoiding any wedging action on the rollers and thereby enabling the utmost freedom of relative turning of the members 6, 9. The roller or thrust bearing is locked in place by a nut 27 that is threaded upon the lower end of the shaft 16. A cap 28 is secured to the bottom of the member 9 and houses the bottom of the shaft.

Oil is fed into the recess 22 and lubricates the bearings 24 and 26. The cap 28 acts as a catch for the lubricant and at the same time prevents dust and the like from entering the bearing 26.

The flange 21 acts as a seal for the top of the recess 22 and prevents dust from gaining access to the bearing 24 and at the same time locks the lubricant in the device.

It will be seen that the trailer 2 may swing with respect to the truck 1 and that the swinging movement will turn the member 6 with respect to the member 9. The shaft 16 will be carried with the member 6, and the bearings 24 and 26 disposed between the shaft and the member 9 will permit turning movement therebetween with a minimum of friction. The device is simple in construction because it consists of a single shaft rotatably connecting two members together.

Although I have shown and described one embodiment of my invention, it is to be understood that the same is susceptible of various changes, and I reserve the right to employ such changes as may come within the scope of the invention as claimed.

The device has principally been designed for trailers carrying up to eight tons. The arms 5 are made strong enough to each carry an overload of 4000 pounds. The device is an all steel construction.

The cross arms extending at an angle act as braces and permit a single "working point" to stand up under road strains. By working point is meant the actual connection between the trailer and the truck. The single working point is the shaft or pin 16 which is connected to the member 9 by the ball race 24. The bearing 26 acts as a wear take-up bearing. The tightening of the nut 27 takes up any wear. An oil ring 29 is carried by the member 6 and seals the recess 22 against foreign matter.

Wear takes place on the two bearings 24 and 26. The renewal of these is all that is necessary when the device becomes worn to a point where take-up on the nut 27 comes to an end.

I claim:

1. In a vehicle fifth wheel having upper and lower members; a single annular flange beneath the upper member defining a central recess, the lower member having an uninterrupted cylindrical cavity in which a portion of said flange has a running fit, said cavity being bottomed to provide a shoulder, a shaft having a shoulder seated in the recess and extending below the flange, and unitary thrust and radial bearing means in the cavity, resting on the cavity-shoulder and being spaced below the confronting flange, said bearing means having the shaft-shoulder resting thereon.

2. In a vehicle fifth wheel having upper and lower members; a single annular flange beneath the upper member defining a central recess, the lower member having an uninterrupted cylindrical cavity in which a portion of said flange has a running fit, said cavity being bottomed to provide a shoulder, a shaft having a shoulder seated in the recess and extending below the flange, unitary thrust and radial bearing means in the cavity, resting on the cavity-shoulder and being spaced below the confronting flange, said bearing means having the shaft-shoulder resting thereon, said shaft extending down through the lower member, and bearing means interposed between the lower end of the shaft and the lower member.

3. In a vehicle fifth wheel having upper and lower members, a shaft projecting downwardly from the upper member, an anti-friction main supporting bearing for the shaft associated with the lower member, a radial and axial thrust bearing for the shaft arranged below the main bearing and made to prevent upward movement and sidesway of the shaft and a third lateral bearing for the shaft arranged above the main bearing, the anti-friction members of the main bearing being arranged immediately adjacent the shaft and the third bearing having a radius larger than the radial distance of the said anti-friction members from the axis of the shaft.

4. In a vehicle fifth wheel having upper and lower members, a shaft projecting downwardly from the upper member into the lower member and a combination anti-friction radial and axial thrust bearing for the shaft associated with the lower member, the bearing being arranged in close proximity to the axis of the shaft to prevent slight turning movements of the upper member from appreciably moving the anti-friction elements of the bearing, and lateral supporting bearings arranged above and below the said thrust bearing.

5. In a vehicle fifth wheel having upper and lower members, a single annular flange beneath the upper member, the lower member having a cylindrical cavity in which a portion of said flange has a running fit, said cavity being bottomed to provide a shoulder, a shaft having a shoulder extending below the flange, and unitary thrust and radial bearing means in the cavity, resting on the cavity shoulder and being spaced below the confronting flange, said bearing means having the shaft shoulder resting thereon.

6. In a vehicle fifth wheel having upper and lower members, a shaft projecting downwardly from the upper member, an anti-friction main supporting bearing for the shaft associated with the lower member and a lateral bearing for the shaft arranged above the main bearing, the anti-friction members of the main bearing being arranged immediately adjacent the shaft and the lateral bearing having a radius larger than the radial distance of the said anti-friction members from the axis of the shaft.

BERT F. LINTON.